Patented May 16, 1950

2,508,342

UNITED STATES PATENT OFFICE 2,508,342

VINYL RESIN EMULSION

Wilfred K. Wilson, Springfield, Mass., assignor to Shawinigan Resins Corporation, Springfield, Mass., a corporation of Massachusetts No Drawing. Application November 22, 1946, Serial No. 711,792

2 Claims. (Cl. 260—17)

This invention relates to the emulsion polymerization of vinyl acetate.

Various methods have been proposed for polymerizing aqueous emulsions of vinyl acetate. Usually the object of such processes has been the production of stable emulsions. However, such prior processes have tended to be deficient in certain respects. For example, difficulty has been encountered in producing emulsions with a high concentration of polymer particles of small and uniform particle size. Other defects include lack of stability of the emulsion, poor filming properties, etc.

It is an object of this invention to provide aqueous emulsions of polyvinyl acetate. A particular object is to provide stable, aqueous emulsions of polyvinyl acetate which are characterized by containing polymer particles of small and uniform particle size, good filming properties and a polymer-water ratio greater than 25:100. A further object is to provide a new process for polymerizing vinyl acetate in aqueous emulsion.

These and other objects are attained, according to this invention, by polymerizing vinyl acetate as the dispersed phase of an aqueous emulsion protected by a combination of an alkylaryl hydrocarbon sulfonic acid salt and hydroxy ethyl cellulose, the initial amount of monomer that is introduced not exceeding about 25 parts by weight for every 100 parts of water present and the remainder being added at such a rate that this ratio of monomer to water is not exceeded throughout substantially the entire polymerization period, said polymerization being carried out in the presence of a water-soluble persulfate catalyst.

By carrying out the polymerization in the manner described above, it is unexpectedly discovered that emulsions may be prepared in which the polymer particles are of exceedingly small and uniform particle size.

The following examples are illustrative of the present invention, but are not to be considered as limitative of the scope thereof. Where parts are given, they are parts by weight.

In the table are set forth the variations in the amounts of the ingredients used in Examples I–VIII in addition to vinyl acetate and water. The numerals represent parts by weight.

In each of the examples in the table, 56 parts of vinyl acetate and 42 parts of water are used in the charge in addition to the ingredients set forth in the table. The procedure employed for carrying out the polymerization is the same in each example. About 5% of the vinyl acetate, 90% of the water and all of the remaining ingredients except the sodium bicarbonate are charged into a reaction vessel equipped with heating and cooling means, an agitator and a water-cooled return condenser. The mixture is then heated to about 75-85° C. with moderate agitation and while continuing the agitation and maintaining the same temperature, the remaining vinyl acetate and a solution of the sodium bicarbonate in the remaining water are slowly added. The rate of addition of the vinyl acetate is such as to permit the maintenance of the 75-85° C. temperature with little or no refluxing. About 3 hours is required for the addition of the vinyl acetate. After all of the vinyl acetate is added, the temperature of the reaction mixture is raised to 85-90° C. After 15-30 minutes at this temperature, the mixture is cooled to room temperature. The rate of addition of the sodium bicarbonate solution is such that addition of this solution is continued until the end of the heating period.

In Examples III, IV and VII, the reaction vessel is constructed of glass. In the remaining examples, a stainless steel reactor is used.

Except for Examples VI and VII, the hydroxy ethyl cellulose is Cellosize WS 100. In Example VI a mixture of 0.7 part WS 100 and 0.3 part WS 500 is used. In Example VII, WS 500 is used.

The product in each of the examples comprises a stable aqueous emulsion of polyvinyl acetate having the characteristics indicated in the table.

TABLE

| Example | I | II | III | IV | V | VI | VII | VIII |
|---|---|---|---|---|---|---|---|---|
| Charge Variations: | | | | | | | | |
| Cellosize | 1.1 | 1.0 | 1.0 | 1.3 | 1.25 | 1.0 | 1.0 | 1.0 |
| Santomerse #3 | 0.15 | 0.15 | 0.15 | 0.1 | 0.1 | 0.1 | 0.2 | 0.05 |
| Potassium persulfate | 0.15 | 0.1 | 0.05 | 0.2 | 0.2 | 0.1 | 0.2 | 0.2 |
| Sodium Bicarbonate | 0.11 | 0.1 | 0.05 | 0.15 | 0.15 | 0.075 | 0.15 | 0.15 |
| Sapamine MS Conc. | 0.05 | 0.04 | 0.05 | | | | | |
| Properties of the Products: | | | | | | | | |
| Emulsion Viscosity (Modified Scott Cup Units at 20° C.) | 825 | 525 | 1,400 | 940 | 420 | 1,000 | 600 | |
| Polymer Viscosity at 20° C. (centipoises) | 46.8 | 38.3 | 68.3 | | 17.5 | | 32.8 | |
| pH | 5.05 | 4.4 | | | 5.2 | 4.75 | 4.7 | 4.63 |
| Per cent Acidity calculated as acetic acid | 0.087 | | | | 0.044 | 0.088 | 0.10 | |
| Per cent Residual Monomeric Vinyl Acetate | 0.35 | | | | 0.59 | | | |
| Solids Content | 56.5 | | | | 56.5 | 56.7 | 56.6 | |

As may be seen by examination of the viscosity results in Examples II and III, the amount of potassium persulfate which is employed has a profound effect on the viscosity of the emulsion obtained, the viscosity being increased by decreasing the amount of potassium persulfate. The effect of varying the amount of hydroxy ethyl cellulose is illustrated by Examples IV and V, which show that increasing the amount of hydroxy ethyl cellulose markedly increases the emulsion viscosity.

A particularly unexpected feature of the invention resides in the fact that by varying the amount of potassium persulfate, the viscosity of the resulting emulsion may be varied with far less effect on the viscosity of the polymer.

While all of the examples in the table show the addition of sodium bicarbonate solution at a substantially uniform rate during the polymerization, it is possible to produce emulsions having the characteristic features of the products of the invention without resorting to this addition of an alkaline material. Such a process is illustrated in the following example.

Example IX

|  | Parts |
|---|---|
| Vinyl acetate | 53 |
| Water | 44 |
| Cellosize WS 100 | 2.5 |
| Santomerse #3 | 0.15 |
| Potassium persulfate | 0.2 |

The procedure in this example is the same as that used in Examples I–VIII, except that all of the water is initially introduced and there is no addition of sodium bicarbonate during the polymerization. The product is characterized by the same unexpected properties of small and uniform particle size, etc. as are exhibited by the products of the examples in the table. However, the product in this example possesses a somewhat lower pH.

The emulsions of the present invention, as illustrated by the foregoing examples, are characterized by unexpected and valuable properties as a result of the particular polymerization conditions employed. For example, these emulsions are characterized by containing polymer particles of a very small and substantially uniform size. Thus, the average diameter of the particles in these emulsions varies from about 0.2 mu to not over 0.5 mu and most of the particles fall within this range. Obviously, such a small and uniform particle size renders the emulsions of particular value for many applications. In addition, the emulsions generally are stable over long periods of time in that no "sludging" occurs. The emulsions are particularly adapted for casting films on various types of surfaces, which films, after drying, are characterized by clarity and high water resistance, particularly as evidenced by resistance to emulsification upon contact with water. Further advantages of these emulsions include good mechanical stability, i. e., freedom from de-emulsification or agglomeration on "rubbing" the material between two surfaces. Another advantage of these emulsions is their exceptional resistance to "creaming," i. e., separation of supernatant liquid.

It is also to be seen from the results set forth in the table that the products of this invention are outstanding as regards freedom from monomeric materials and low acidity. The products of the invention are further characterized by substantially complete solubility of the polymer particles in the usual solvents for polyvinyl acetate. Furthermore, on subjecting the materials of the invention to such mechanical stress as results from treatment with a homogenizer or colloid mill, the viscosity remains substantially constant.

Example X

|  | Parts |
|---|---|
| Vinyl acetate | 34 |
| Water | 64 |
| Cellosize WS 100 | 2 |
| Santomerse #3 | 0.15 |
| Potassium persulfate | 0.15 |
| Sodium bicarbonate | 0.11 |

The polymerization is carried out in the same manner as that used in the examples in the table. The product is characterized by the same desirable features as those possessed by the products set forth in the table and in addition, is characterized by an unusually low average particle size of 0.05 to 0.2 mu.

In general, it is found that emulsions in which the polymer particles possess such unusually low particle sizes may be prepared in accordance with the process of the invention if the weight ratio of water to the total vinyl acetate introduced and polymerized is maintained within the limits 100:30 to 100:60.

As pointed out above and as illustrated in the examples, the process of the invention comprises initially introducing not over about 25 parts of the monomeric material to be polymerized for each 100 parts of water and after polymerization has been initiated, introducing the remainder of the polymerizable material, either continuously or by stepwise addition. Preferably, the remainder of the monomeric material is introduced at such a rate that substantially throughout the polymerization the amount of unpolymerized material does not exceed about 25 parts for every 100 parts of water present. An alternative method of carrying out the polymerization comprises introducing the monomeric material substantially at the rate of polymerization throughout the reaction. For example, the mixture of water, wetting agent, catalyst and colloid may be heated to the selected reaction temperature and thereafter the monomer introduced at substantially its rate of polymerization.

The polymerization method of the invention is surprisingly found to be readily adapted to polymerization of vinyl acetate under atmospheric reflux conditions at temperatures below 100° C., but above the boiling point of vinyl acetate. Thus, following the initial addition of the vinyl acetate, the reaction mixture may be heated up to a polymerization temperature in excess of the boiling point of the vinyl acetate, i. e., 75–85° C. During the course of this heating period, sufficient vinyl acetate polymerizes so that the boiling point of the mixture increases to a temperature at least equal to the temperature selected for polymerization. Thereafter, the vinyl acetate may be added at such a rate that the boiling point of the reaction mixture continues to be at least equal to the selected polymerization temperature. The maximum rate at which the vinyl acetate may be added without causing the boiling point of the mixture to fall below the polymerization temperature is substantially the rate of polymerization of the monomer, particularly if the initial monomer-water ratio is not substantially less than 25:100, although it may be that an increasing accumulation of monomer is possible as the polymerization continues due to greater absorptive capacity of the mixture by virtue of increased quantity of polymer.

Usually the polymerization in aqueous emulsion is carried out at a pH of 2–7, and preferably within the range 4–6. When it is desired to lower the initial pH of the polymerizing mixture, various acids may be used for this purpose, such as formic acid, acetic acid, chloracetic acid, benzene sulfonic acid, toluene sulfonic acid, nitric acid, hydrochloric acid, sulfuric acid and the like.

Numerous other variations may be introduced into the process of the invention as illustrated by the specific examples. For example, other polymerizing temperatures may be used, the exact temperature depending in part on the nature of the polymer desired. However, temperatures between 60° C. and 100° C. are usually employed. When necessary, for example, to prevent escape of volatile materials, the polymerization may be carried out under pressure in a closed system.

The amounts of wetting agent and hydroxy ethyl cellulose may be substantially varied. Large amounts of such materials are usually undesirable since they may adversely affect the characteristics of the product. On the other hand, a certain minimum is necessary for proper stability of the emulsion, both during and after polymerization. Usually 0.01 part to 2.0 parts and preferably 0.1–1 part of a wetting agent and 1 to 10 parts of hydroxy ethyl cellulose per 100 parts of water are found to produce exceptionally valuable products.

In making aqueous emulsions of polymerized vinyl compounds according to the process of the invention, the ratio of water to polymerizable compound may be varied substantially. As pointed out above, a valuable feature of the invention resides in the fact that valuable emulsions are readily prepared which have a polymer:water ratio of over 25:100. Generally, the total amount of vinyl acetate introduced and polymerized is much higher, e. g., weight ratios of vinyl acetate to water of between 40:60 and 60:40. Usually the weight ratio of water to the total vinyl acetate introduced and polymerized is not lower than 30:70 since the viscosity of the polymerizing mixture becomes too high to permit adequate agitation. A particularly valuable characteristic of the process of the invention resides in the fact that emulsions may be produced having an exceptionally high solids content, e. g., 40 to 60%, and in which the polymer is made up of particles of small and uniform particle size. However, as pointed out hereinbefore, emulsions containing particles of exceedingly fine and uniform size are obtained by employing somewhat lower vinyl acetate concentrations.

The surface tension depressants or wetting agents used in the process of the invention are characterized by containing an alkali metal sulfonate group and an alkyl-aryl hydrocarbon group containing 10–20 carbon atoms such as the isobutyl naphthalene sulfonates, Nekal BX (sodium diisobutyl naphthalene sulfonate), Santomerse #3 (dodecyl benzene sodium sulfonate), Santomerse D (decyl benzene sodium sulfonate), Invadine N (sodium alkyl naphthalene sulfonate). Particularly preferred are the alkali metal sulfonates of alkyl benzenes in which the alkyl group contains 10–12 carbon atoms, e. g., the Santomerses mentioned above.

In place of the sodium sulfonates, other alkali metal sulfonates may be used, as for example, the corresponding potassium salts.

Various hydroxy ethyl celluloses may be used in the process of the invention. Examples of commercial hydroxy ethyl celluloses suitable for the purposes of the present invention are those marketed under the trade names Cellosize WS 20, Cellosize WS 100, Cellosize WS 500 and Cellosize WS 1000. The choice of any particular hydroxy ethyl cellulose or combination of hydroxy ethyl celluloses depends in part on the particular properties desired in the final emulsion, e. g., viscosity. Thus, the viscosity of the product is increased by the use of Cellosizes having the higher numbers.

In place of potassium persulfate, other water-soluble persulfates may be used, as for example, sodium persulfate or other alkali metal persulfates, ammonium persulfate, etc. The amount of persulfate employed depends to some extent on the nature of the material being polymerized and the properties, e. g., viscosity, desired in the final emulsion. Usually the amount of persulfate used is such as to contain 0.001–0.1 part of available oxygen for every 100 parts of water.

In certain of the examples, the addition of a sodium carbonate solution during the polymerization is exemplified. The purpose of this addition is to offset acidity which presumably results from a certain amount of decomposition of the persulfate catalyst. The addition of sodium bicarbonate while desirable for keeping down the acidity, is not essential for producing stable, fine-grained emulsions. In place of sodium bicarbonate, other alkaline materials may be used when so desired, as for example, sodium carbonate, potassium carbonate, potassium bicarbonate, sodium hydroxide, potassium hydroxide, water-soluble amines, e. g. ethylene diamine, quaternary ammonium bases, e. g., dimethyl dibenzyl ammonium hydroxide, trimethyl benzyl ammonium hydroxide, tetraethyl ammonium hydroxide, tetraethanol ammonium hydroxide alkanol amines, e. g., triethanol amine, etc.

The amount of sodium bicarbonate or other alkaline material added to offset the acidity which is developed during the polymerization is usually an amount sufficient to neutralize the acidity which would result if all of the persulfate were to decompose. Somewhat smaller amounts may be used when desired, but preferably the amount added is such as to produce an emulsion having a pH of 4–6.

As illustrated by certain specific examples, it is frequently desirable to include an agent for preventing excessive foaming during the polymerization. In place of the "Sapamine MS Concentrated" used in certain of the examples, other anti-foaming agents may be used in small amounts such as barium chloride, Triton K–12, Triton K–60, Foamex, and the like, anti-foaming agents which are quaternary ammonium salts being preferred. Especially suitable is "D. C. Antifoam A" (a silicon compound marketed by Dow Corning) which is effective in amounts as low as 0.01% based on the water present. However, it is not essential that foam preventive agent be used in order to prepare the emulsions having the characteristic properties of the invention, particularly if the amount of agitation is not excessive and a reaction vessel of ample size with reference to the size of the charge is employed.

When it is desired to achieve particular properties in the emulsions, various modifiers may be included in the emulsions, e. g., other surface tension depressants, protective colloids, coloring matter, etc. Such additives may be made before, during or subsequent to the polymerization. Thus, if 5-10 parts of gum arabic are included in the charge for every 100 parts of water, the resulting emulsion is unusually resistant to coagulation by the subsequent addition to the product of various types of additives. Furthermore, it has been discovered that such a charge is surprisingly free from a tendency to foam during polymerization even in the absence of an antifoaming agent such as Sapamine MS.

The emulsions of the invention are especially valuable for forming films on various types of materials such as cloth, paper, wood, metals, glass and the like. The particularly valuable properties of films formed from these emulsions include resistance to water. Thus, prior emulsions of such materials as polyvinyl acetate tended to re-emulsify when immersed in water. Usually, when it is desired to form films from the emulsions, it is advantageous to add to the emulsions a small amount, e. g. 2 to 10%, of a plasticizer for the polyvinyl acetate. For example, such plasticizers as dibutyl phthalate and triethylene glycol dihexoate may be used. Films resulting from such products are characterized not only by resistance to water, but are uniform, clear and possess high wet strength after immersion in water.

This application is a continuation-in-part of my co-pending application Ser. No. 677,902, filed June 19, 1946, now U. S. Patent No 2,508,341.

The abbreviation "mu" is used to represent "micron" wherever it appears in the specification and claims.

It is obvious that many variations may be made in the process and products of this invention without departing from the spirit and scope thereof as defined in the appended claims.

What is claimed is:

1. A process for preparing a stable aqueous emulsion of polyvinyl acetate which comprises polymerizing vinyl acetate while dispersed in an aqueous medium containing for every 100 parts of water, 1-10 parts of a hydroxy ethyl cellulose, 0.01-2.0 parts of a non-polymerizable surface tension depressant characterized by containing an alkali metal sulfonate of an alkyl aryl hydrocarbon, said hydrocarbon containing 10-20 carbon atoms, and a sufficient amount of a water soluble persulfate to supply 0.001-0.1 part of available oxygen, the vinyl acetate being introduced at such a rate that not over about 25 parts of monomer for every 100 parts of water are present substantially throughout the polymerization, and the weight ratio of water to total vinyl acetate introduced and polymerized is between 100:30 and 100:60, whereby the polymer particles have a diameter of 0.05-0.2 micron.

2. A stable aqueous polyvinyl acetate emulsion in which the polymer particles have a diameter of 0.05-0.2 micron, said emulsion having a water:polyvinyl acetate ratio between 100:30 and 100:60 and said emulsion being produced by the process defined in claim 1.

WILFRED K. WILSON.

REFERENCES CITED

The following references are of record in the file of this patent:

UNITED STATES PATENTS

| Number | Name | Date |
| --- | --- | --- |
| 2,068,424 | Mark et al. | Jan. 19, 1937 |
| 2,109,981 | Voss et al. | Mar. 1, 1938 |
| 2,339,184 | Neher et al. | Jan. 11, 1944 |
| 2,341,413 | Pense et al. | Feb. 8, 1944 |
| 2,363,951 | Fikentscher | Nov. 28, 1944 |
| 2,388,600 | Collins | Nov. 6, 1945 |
| 2,388,601 | Collins | Nov. 6, 1945 |
| 2,398,344 | Collins et al. | Apr. 16, 1946 |
| 2,444,396 | Collins et al. | June 29, 1948 |